United States Patent Office 2,856,304
Patented Oct. 14, 1958

2,856,304

CEMENTITIOUS COMPOSITIONS AND METHOD OF MAKING THE SAME

George B. Kirk, Redwood City, Calif., assignor to Kaiser Gypsum Company, Inc., Oakland, Calif., a corporation of Washington No Drawing. Application December 28, 1953
Serial No. 400,819

14 Claims. (Cl. 106—111)

This invention relates to gypsum products and the preparation thereof; and to the preparation of calcined gypsum-water slurries of improved properties.

In many applications of calcined gypsum, it is desirable to adjust the water-gypsum ratio in order to obtain the most satisfactory and economical results. In the manufacture of gypsum products, for example, wallboard, lath, plaster board, sheathing or other products, calcined gypsum is formed into a slurry with a suitable amount of water and, where customary, with other additives such as paper fiber, wood fiber, starch, rosin, etc. In the preparation of wallboard or similar products, for instance, the slurry is deposited between paper liners, pressed to the desired thickness by forming rolls, allowed to set and harden, cut to desired lengths, and passed through a dryer to remove excess moisture. A portion of the water employed in making the slurry combines with the calcined gypsum as water of crystallization in forming the final set mass of interlaced crystals, but a large portion of this water must be removed in the dryer. Since the dryer is maintained at higher temperature, the drying process is more costly as the proportion of water to be removed is higher.

It is an object of this invention to provide a method for reducing the proportion of water required to make a plastic slurry with calcined gypsum. It is a further object to provide a method of preparing a plastic calcined gypsum slurry which, after forming into shapes, can be dried more rapidly. It is also among the objects of this invention to provide a method for increasing the speed of production of gypsum objects, and reducing the cost of such production, in commercial installations. And it is still another object of the invention to control the setting time of plastic calcined gypsum slurry.

According to the present invention, it has been found that the amount of water required to make a plastic slurry of calcined gypsum is reduced by admixing in such slurry from 0.05% to 1.00% of a dispersive agent, which is a lignin compound or derivative obtained by digesting wood to produce cellulose pulp, for example, lignone sulfonate or alkali lignin. Preferably, from 0.1% to 1.00% of the lignin material is added. Waste sulfite liquor, which is commonly produced in the forming of pulp from wood by digestion with bisulfite is preferably employed. In the improved final gypsum product of this invention, the added agent is present, after drying, as a uniform dispersion through the mass of set gypsum crystals. Where waste sulfite liquor is employed, the dried residue thereof will remain, dispersed in the crystal mass. Lignin derivatives of black liquor, as more fully described below, are also useful. Mixtures of such agents can be employed if desired.

The lignin derivative or material is suitably added in the form of a water solution to the water slurry of calcined gypsum; but it can be added as a solution in the slurrying water. Alternatively, the dry agent is added in the slurry. In a variation, the agent can be admixed with raw gypsum and the admixture then calcined in the usual manner to convert the raw gypsum to the desired calcium sulfate hemihydrate, and the calcined admixture then made up into a plastic slurry, but as will be later explained this will vary the effect of the lignin derivative in some instances.

When waste sulfite liquor is employed, it can be admixed as such, or in concentrated form, or the dried residue of such liquor can be employed.

In the commercial manufacture of calcined gypsum products, the neat plaster or stucco will set in from 20 to 50 minutes. It is usually desirable to increase or decrease this time, depending upon the commercial application in which the calcined gypsum is employed. It is therefore an advantage in some operations that the addition of the waste sulfite liquor or dried residue thereof effects a retardation in the setting time of the calcined gypsum slurry. However, where desired, the setting time can be accelerated by adding from 0.01% to 1.00%, by weight, of an accelerating agent as known in this art, for example, sodium chloride, aluminum sulfate, potassium sulfate, calcium sulfate dihydrate, uncalcined or raw gypsum, or a mixture of such substances. The setting time can be accelerated if desired, on the other hand, while also obtaining reduced normal consistency, by adding a purified lignin derivative of black liquor as will be more completely described in an example below. The setting time can alternatively be accelerated by admixing waste sulfite liquor or dried residue thereof with the raw gypsum prior to calcining, and then calcining the mixture and forming into slurry, the liquor or residue being added in an amount of from 0.05% to 1.00%, while at the same time the advantages of reduced normal consistency are retained. For example, the setting time of a kettle-calcined gypsum, is 30 minutes and the normal consistency is 92; whereas a portion of gypsum, to which has been added 0.5% dried waste sulfite liquor and the mixture then kettle-calcined, has a normal consistency of 74 and a setting time of 24 minutes. If desired to lengthen the setting time there can also be added in the practice of this invention a small amount, for instance, from 0.01% to 0.07%, of a retarder as known to the art, for example, a partially hydrolyzed proteinaceous substance, such as keratin.

The examples below will illustrate more clearly the mode of carrying out the process of this invention, and the products obtained thereby.

EXAMPLE 1

In an example of the excellent results obtained with the present invention, a batch of calcined gypsum is divided into seven portions. Each portion is made into a plastic slurry with water where the mixing water contains in solution the amount of waste sulfite liquor, calculated as dry residue thereof, shown in Table I below; that is, to one portion is added no waste sulfite liquor, and to the succeeding six portions waste sulfite liquor is added, calculated as indicated above, in these respective amounts, 0.02%, 0.06%, 0.10%, 0.20%, 0.40%, and 1.00%. As shown in the table, the amount of water, measured in milliliters, required to be admixed with 100 grams of calcined gypsum to form a mixture of such consistency that it will just pour from a cup, decreases greatly with even very small amounts of the consistency-reducing agent, and continues to decrease as more is added. It is also found that the setting time is retarded when this agent is admixed in an amount of at least 0.05%. For example, the batch in this series, containing no additive has a setting time of 20 minutes, whereas with additive as noted the setting times increase until, when 1.00% is admixed, the setting time is 32 minutes.

Table I

| Batch | Waste Sulfite Liquor added percent (Dry Basis) | Ml. water per 100 gms. Calcined gypsum | Setting Time, Minutes |
| --- | --- | --- | --- |
| 1 | 0.0 | 70 | 20 |
| 2 | 0.02 | 64 | 20 |
| 3 | 0.06 | 64 | 22 |
| 4 | 0.10 | 64 | 23 |
| 5 | 0.20 | 64 | 26 |
| 6 | 0.40 | 63 | 29 |
| 7 | 1.00 | 60 | 32 |

If desired, a commercial retarder can be also added in such a mixture, in the manner described above, to further lengthen setting time while still obtaining the advantages of this invention.

EXAMPLE 2

Conversely, instead of reducing the amount of water admixed in the slurry, the amount of calcined gypsum admixed therein can be correspondingly increased when adding the dispersive agent according to this invention. Table II summarizes another series of tests and shows the increase in the amount of calcined gypsum which can be employed when the amount of water remains constant. In this series of tests, a batch of calcined gypsum is divided into six portions, and each portion is made into a slurry of a consistency to just pour from a cup. In each test, 35 ml. of water are used and sufficient calcined gypsum is employed to give the consistency described; and in each test waste sulfite liquor is added in the amount shown. The last column shows the percentage increase in the amount of calcined gypsum which can be employed to obtain the same consistency in each test, with increasing amounts of the dispersive agent.

Table II

| Test No. | Waste Sulfite Liquor, grams | Water, Milliliters | Calcined Gypsum, grams | Increase Calcined gypsum, percent |
| --- | --- | --- | --- | --- |
| 1 | 0.0 | 35 | 50 | |
| 2 | 0.01 | 35 | 56 | 12 |
| 3 | 0.03 | 35 | 56 | 12 |
| 4 | 0.05 | 35 | 57 | 14 |
| 5 | 0.10 | 35 | 57 | 14 |
| 6 | 0.20 | 35 | 60 | 20 |

EXAMPLE 3

In a further example of carrying out the method according to the present invention, dried waste sulfite liquor is thoroughly admixed with batches of raw (uncalcined) gypsum in the amounts shown in Table III below, the mixtures calcined at the temperatures indicated, and, when made into plastic slurries with water, the normal consistency is found to decrease as shown.

Table III

| Amount Added Agent | Calcining Temperatures, °C. | ml. water per 100 gms. calcined mix |
| --- | --- | --- |
| 0.0% | 122 | 92 |
| 0.1% | 124 | 85 |
| 0.2% | 125 | 78 |
| 0.5% | 126 | 74 |

This example also shows the increased calcining temperature which is obtained.

EXAMPLE 4

A further example demonstrates the beneficial effects of operating according to this invention in the manufacture of gypsum wallboard, plasterboard and the like, because thereby the amount of water required to form the slurry is reduced and, consequently, the amount of water which it is necessary to remove in order to dry the board is reduced. In working according to the prior art and without the addition of a dispersive agent, approximately 1400 to 1500 pounds of calcined gypsum with the small amounts of modifying additives such as paper fiber, sawdust, starch and rosin soap as customarily employed, require approximately 1225 pounds of water to make a plastic slurry which is then formed into 1000 square feet of gypsum wallboard of one-half inch thickness. In order to dry this board for commercial use, approximately 1000 pounds of water must be removed in the dryer. However, in working according to the present invention, when a similar 1500 pound batch is slurried with water containing three pounds of waste sulfite liquor, calculated as the dry residue, only 1125 pounds of water are required to form a plastic slurry, and only 900 pounds of water must be removed in the dryer. The evaporation of this amount of water enables operating the dryer at higher speed, and thus an increase in production of from 8% to 10% is obtained when operating according to the invention.

EXAMPLE 5

A batch of calcined gypsum is divided into five portions, and each portion is made into a plastic slurry by mixing with water and with the respective amounts shown in Table VII of two purified lignin derivatives of black liquor resulting from the digestion of wood with caustic soda or with sodium sulfite to make cellulose pulp. These lignin derivatives are described in a brochure entitled "Indulin-Lignin From Pine Wood" published by West Virginia Pulp and Paper Company, and they are herein designated lignin derivative A and lignin derivative C, the latter being the sodium salt of the former. Lignin derivative A contains about 65% carbon, 5% hydrogen and 30% oxygen and has a molecular weight of about 840, containing four methoxyl groups, at least four hydroxyl groups and perhaps a carbonyl group; and an analysis thereof shows pH 3.4, 13.9% methoxyl and 0.4% ash. An analysis of lignin derivative C shows pH 9.3, 11.5% methoxyl and 19.1% ash. Table IV shows the reduction in the amount of water required to make a plastic calcined gypsum slurry when employing these substances as shown; and also the decrease in setting time obtainable thereby.

Table IV

| Test Number | Lignin Derivative Added | Water: Ml. per 100 gms. Calcined gypsum | Setting Time, Minutes |
| --- | --- | --- | --- |
| 1 | 0.0 | 70 | 22 |
| 2 | 0.25% lignin derivative A | 58 | 14 |
| 3 | 0.5% lignin derivative A | 58 | 13 |
| 4 | 0.25% lignin derivative C | 58 | 14 |
| 5 | 0.5% lignin derivative C | 58 | 14 |

The tensile strength of the gypsum product increases when the about lignin derivatives are added, also. The untreated gypsum product as of test No. 1 in Table IV has a tensile strength of 250 p. s. i. whereas when 0.05%, 0.10% or 1% of lignin derivative A is added, the tensile strength typically increases to 300, 345 and 400 p. s. i., respectively. The purified lignin material or derivative A is obtained from black liquor by treatment of the latter with acid to precipitate the thus insolubilized lignin material and the precipitated solid recovered is the desired purified lignin material A. The lignin derivative or material C is the water-soluble sodium salt or soap of the purified lignin derivative A.

It is an advantage of the present invention that the amount of water required to form a calcined gypsum slurry having the necessary plasticity is considerably reduced, and the production of gypsum shapes simultaneously accelerated, while at the same time the strengths of the formed products are actually increased. This is demonstrated by the test described below, the results of which are set forth in Table V.

In this series of tests, a water slurry of calcined gypsum is divided into two portions, A and B, respectively; and a commercial gypsum slurry in water, as employed in making gypsum wallboard according to good industrial practice, is divided into two portions, C and D. Portions A and C are cast into the form of cubes, two inches on an edge. To portion B is added, with thorough mixing, 0.5% by weight of dried residue of waste sulfite liquor, and the so-treated slurry is cast into similar two-inch cubes. To portion D is added, with thorough stirring, 0.7% by weight of the dried residue employed in B, and the mixture cast into two-inch cubes. The cubes are dried, and are weighed and tested for compressive strength. The results are shown in Table V.

Table V

| Batch | Average dry weight two-inch cube, in grams | Crushing stress, in lbs. per square inch |
|---|---|---|
| A | 135 | 1,070–1,150 |
| B | 158 | 1,200–1,340 |
| C | 105 | 650– 700 |
| D | 114 | 900–1,025 |

These results demonstrate clearly that the admixture of the consistency-reducing agent has the advantageous effect of increasing the strength of the final product.

In a test with gypsum wallboard-making slurry, a portion, E, of a standard commercial slurry is cast into wallboard, one-half inch thick, and dried; and with another portion, F, of the same slurry is intimately admixed 0.7% by weight of the dried waste sulfite liquor described in regard to B, above, and the mixture cast into wallboard in the same way and dried. From each batch of board, 12" x 15" samples are cut, which are weighed and are tested for flexural strength. Flexural strength is determined by supporting a 12" x 16" sample on fixed parallel bearings 14 inches between centers, and the load being applied to the upper surface midway between the supports. The flexural strength is the load under which the sample fails by breaking. The results are shown in Table VI.

Table VI

| Batch | Dry weight in pounds per 1,000 square feet | Flexural strength |
|---|---|---|
| E | 1,890–1,910 | 163–170 |
| F | 1,970–1,990 | 179–185 |

These results demonstrate the advantages of greater strengths obtained by employing the dispersive agent of this invention.

It is an advantage of the present invention that the incorporation of the dispersive agent according to this invention improves the water-repellency characteristics of gypsum products containing agents imparting water-resistance thereto. The dispersive agents of this invention are particularly useful when employed with the water-repellency agents, as described in the co-pending application of Riddell and Kirk, Serial Number 172,867, filed July 10, 1950, now U. S. 2,604,411, issued July 22, 1952, which relates to incorporating in calcined gypsum slurries from 0.5% to 2.0% of a petroleum wax such as slack wax or microcrystalline wax, in the form of a water emulsion, and from 2% to 10% residual fuel oil, pine tar or coal tar; and as described in the co-pending application of Riddell and Kirk, Serial Number 172,868, filed July 10, 1950, now U. S. 2,610,130, September 9, 1952, which relates to incorporating in such slurries from 0.5% to 2.0% of rosin in water emulsion and from 2% to 10% of residual fuel oil; and as described in the co-pending application of Riddell and Kirk, Serial Number 182,526, filed August 31, 1950, now U. S. 2,597,901, May 27, 1952, which relates to incorporating in such slurries from 1% to 2% of an alkali metal rosin soap and from 0.5% to 1.0% of an alkaline earth metal salt and from 5% to 10% of residual fuel oil.

These advantageous results are shown by the following tests, summarized in Table VII. The test slurries of series 1 are prepared by mixing 1.0% microcrystalline wax, in water emulsion, and 10% residual fuel oil with a calcined gypsum slurry. Those of series 2 are prepared by mixing 1.0% of rosin, in water emulsion, and 10% residual fuel oil with a calcined gypsum slurry. Those of series 3 are prepared by mixing with a calcined gypsum slurry 2.0% of potassium rosin soap, 0.7% $CaCl_2$ and 10% residual fuel oil. In each series, portion "A" is formed into cubes without further admixture. To portion "B" in each series is added with thorough mixing 0.5% of dried residue of waste sulfite liquor. The respective portions are cast into two-inch cubes, and the cubes are dried and then immersed in water for five hours at 70° C., with a one-inch head of water above the test pieces, and the amount of water absorbed is then determined.

Table VII

| Series | Water absorption after five hours' immersion | |
|---|---|---|
| | A, percent | B, percent |
| 1 | 2.1 | 0.46 |
| 2 | 1.8 | 1.11 |
| 3 | 6.7 | 3.9 |

It is a particular advantage in making gypsum wallboard according to the method of this invention that excellent bonding of the core to the paper liners is achieved. The addition of the lignin materials shown and claimed herein does not cause staining of the paper liner and the board can be dried at the relatively high temperatures shown without "blowing off." The slurry for the core is easily mixed and no segregation or undesirable change in the viscosity thereof is effected. Also, as will be noted in Table III above, the critical calcining temperature for gypsum is increased by the addition of waste sulfite liquor. As that table shows, the addition of 0.5% thereof raises the critical calcining temperature 4° C. or 7.2° F. This enables the use of higher drying temperatures without fear of breakdown in the core, and thereby enables increase of several percent in the rate of production in a board plant. Similar results are obtained when adding the purified lignin derivatives of black liquor described above.

In this specification and the claims, percentages given are by weight, and the percentages of the slurry compositions are given on the basis of the dry weight of the total unset gypsum composition, unless otherwise indicated. The term "normal consistency" employed herein is a convenient term, well-known in this art, indicating the amount of water in milliliters required to be mixed with 100 grams of calcined gypsum to form a mixture of such consistency that it will just pour from a cup. The setting times of the gypsum slurries as given herein are determined by preparing a mixture of calcined gypsum and water of normal consistency and pouring the mixture out on a plate to form a pat three and one-half inches in diameter. Set is considered complete when the Gilmore needle penetrates the pat no more than three/thirty-seconds inch. The elapsed time in minutes from the time when the calcined gypsum is first added to the water to that when set is complete is the setting time.

The lignin compounds useful herein are those obtained by chemically digesting wood in the production of cellulose pulp. These digestion processes are well known and comprise, for example, cooking wood with ammonium, magnesium or calcium bisulfite or with sodium sulfite or caustic soda, and separately recovering a pulp and a liquor. The liquors contain the lignin compounds useful herein, the constitution and formulae of which are not exactly known. The lignin compound may be isolated before use, or the liquor itself may be employed herein. The waste sulfite liquor employed herein is that obtained by digesting wood with calcium or magnesium bisulfite, as described in standard texts on this subject. The liquor contains sugars resulting from the hydrolysis of cellulose material, proteins, etc., and also the calcium or magnesium salt of lignosulfonic acid, depending, of course, upon the bisulfite originally employed. Ammonia-base waste sulfite liquor or dried residue thereof is also useful. The essential component of ammonia base liquor is believed to be ammonium lignin sulfonate, and it is associated in the liquor with wood sugar. According to the authorities the mteal or other positive ion salt of the lignosulfonic acid is the principal effective constituent of the liquor. This application is a continuation-in-part of my co-pending application, Serial No. 191,732, filed October 23, 1950, now abandoned. Having now described the invention, what is claimed is:

1. A method for reducing the ratio of water to calcined gypsum required in making a plastic slurry consisting essentially of calcined gypsum and water and for controlling the setting time of said slurry, which comprises incorporating in said slurry from 0.05% to 1.0% of at least one material chosen from the group consisting of waste sulfite liquor, lignone sulfonate, alkali lignin and lignin material acid-precipitated from black liquor and the water-soluble soap of said acid-precipitated black liquor lignin.

2. A method of producing a plastic slurry consisting essentially of water and calcined gypsum having a reduced normal consistency and increased setting time, which comprises admixing with said slurry from 0.05% to 1.0% by weight on the dry basis of waste sulfite liquor.

3. Method as in claim 2 wherein there is admixed from 0.1% to 1.0% of said waste sulfite liquor.

4. Method of producing a plastic slurry consisting essentially of water and calcined gypsum having a reduced normal consistency and a decreased setting time, which comprises admixing raw gypsum and from 0.05% to 1.0% on the dry basis of waste sulfite liquor, calcining said admixture and adding water thereto to form said slurry.

5. Method of producing a plastic slurry consisting essentially of water and calcined gypsum having a reduced normal consistency and decreased setting time, which comprises admixing with said slurry from 0.05% to 1.0% of purified water-soluble soap of acid-precipitated black liquor lignin.

6. Method for reducing the normal consistency, controlling the setting time of a plastic gypsum slurry consisting essentially of calcined gypsum and water and for increasing the calcining temperature of the gypsum product resulting from hydration of the calcined gypsum in said slurry, which comprises incorporating in said slurry from 0.05% to 1.0% of at least one material chosen from the group consisting of waste sulfite liquor, lignone sulfonate, alkali lignin and lignin material acid-precipitated from black liquor and the water-soluble soap of said acid-precipitated black liquor lignin.

7. Process as in claim 6 wherein there is added from 0.1 to 1.0% waste sulfite liquor.

8. Process as in claim 6 wherein there is added from 0.1 to 1.0% water-soluble soap of acid-precipitated black liquor lignin.

9. A gypsum product of increased compressive strength consisting essentially of a set mass of gypsum crystals having uniformly dispersed therethrough from 0.05% to 1.0% on the dry basis of at least one material selected from the group consisting of waste sulfite liquor, lignone sulfonate, lignin material acid-precipitated from black liquor and the water-soluble soap of said acid-precipitated black liquor lignin, and alkali lignin.

10. A gypsum product as in claim 9 containing from 0.1 to 1.0% dried residue of waste sulfite liquor.

11. A gypsum product as in claim 9 containing from 0.1 to 1.0% of water-soluble soap of acid-precipitated black liquor lignin.

12. A gypsum wallboard of increased flexural strength comprising a core and paper liners bonded thereto, said core consisting essentially of a set mass of gypsum crystals having uniformly dispersed therethrough from 0.05% to 1% on the dry basis of a material selected from the group consisting of waste sulfite liquor, lignone sulfonate, lignin material acid-precipitated from black liquor and the water-soluble soap of said acid-precipitated black liquor lignin, and alkali lignin.

13. A gypsum wallboard as in claim 12 containing from 0.1% to 1.0% of dried residue of waste sulfite liquor.

14. A gypsum wallboard as in claim 12 containing from 0.1% to 1.0% water-soluble soap of acid-precipitated black liquor lignin.

References Cited in the file of this patent

UNITED STATES PATENTS

| | | |
|---|---|---|
| 2,141,570 | Mark | Dec. 27, 1938 |
| 2,360,519 | Scripture | Oct. 17, 1944 |
| 2,435,594 | MacPherson | Feb. 10, 1948 |
| 2,483,806 | Buckley et al. | Oct. 4, 1949 |
| 2,662,024 | Riddell | Dec. 8, 1953 |

FOREIGN PATENTS

| | | |
|---|---|---|
| 595,924 | Germany | 1935 |
| 615,778 | Germany | July 12, 1935 |

OTHER REFERENCES

Thorpe's Dictionary of Applied Chemistry, 4th Edition, 1949, v. IX, pages 218–219.

UNITED STATES PATENT OFFICE
CERTIFICATE OF CORRECTION

Patent No. 2,856,304            October 14, 1958

George B. Kirk

It is hereby certified that error appears in the printed specification of the above numbered patent requiring correction and that the said Letters Patent should read as corrected below.

Column 3, Table III, column 3 thereof, under the heading "ml water per 100 gms. calcined mix", second item, for "85" read -- 84 --; column 4, line 27, for "Table VII" read -- Table IV --; line 58, for "about" read -- above --; column 7, line 19, for "mteal" read -- metal --.

Signed and sealed this 4th day of April 1961.

(SEAL)
Attest:    ERNEST W. SWIDER

Attesting Officer

ARTHUR W. CROCKER
Acting Commissioner of Patents